United States Patent
Schottland et al.

(10) Patent No.: US 7,202,292 B2
(45) Date of Patent: Apr. 10, 2007

(54) COLORED POLYMERIC RESIN COMPOSITION WITH 1,8-DIAMINOANTHRAQUINONE DERIVATIVE, ARTICLE MADE THEREFROM, AND METHOD FOR MAKING THE SAME

(75) Inventors: Philippe Schottland, Evansville, IN (US); Krishnamoorthy Sivakumar, Bangalore (IN); Binod Behari Sahoo, Orissa (IN); Ganapati Subray Shankarling, Bangalore (IN); Meerakani Mohamed Ali Sait, Tamil Nadu (IN); Adil Minoo Dhalla, Maharashtra (IN)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 10/619,643

(22) Filed: Jul. 15, 2003

(65) Prior Publication Data

US 2005/0014878 A1    Jan. 20, 2005

(51) Int. Cl.
C08K 5/08    (2006.01)
C08G 64/18    (2006.01)

(52) U.S. Cl. ............... 524/358; 524/356; 524/611; 428/64.4; 428/64.7; 552/225

(58) Field of Classification Search ............. 524/358, 524/611, 356; 428/64.4, 64.7; 552/225
See application file for complete search history.

(56) References Cited

U.S. PATENT DOCUMENTS

| | | | |
|---|---|---|---|
| 2,485,197 A | 10/1949 | Grossmann et al. | |
| 2,848,462 A * | 8/1958 | Gutzwiller et al. | 552/255 |
| 3,312,655 A | 4/1967 | Dien | |
| 3,507,606 A | 4/1970 | Hildreth et al. | 8/39 |
| 3,635,895 A | 1/1972 | Kramer | 260/47 XA |
| 3,646,071 A | 2/1972 | Frey et al. | 260/371 |
| 3,697,395 A | 10/1972 | Kehr et al. | 204/159.14 |
| 3,697,402 A | 10/1972 | Kehr et al. | 204/159.14 |
| 3,768,976 A | 10/1973 | Hu et al. | 23/254 R |
| 3,853,807 A * | 12/1974 | Hunter | 428/220 |
| 3,875,191 A * | 4/1975 | Toth | 552/253 |
| 3,880,869 A | 4/1975 | Scheuermann et al. | 260/296 P |
| 3,923,454 A | 12/1975 | Genta | 8/39 |
| 3,933,868 A * | 1/1976 | Thiem et al. | 552/238 |
| 3,945,979 A | 3/1976 | Kobayashi et al. | |
| 3,960,751 A * | 6/1976 | Moriyama et al. | 252/299.1 |
| 3,979,459 A | 9/1976 | Rose | 260/591 |
| 4,001,184 A | 1/1977 | Scott | 260/47 XA |
| 4,128,396 A | 12/1978 | Wick et al. | 8/39 C |
| 4,179,548 A | 12/1979 | Schroeter et al. | 525/329 |
| 4,217,438 A | 8/1980 | Brunelle et al. | 528/202 |
| 4,220,707 A | 9/1980 | Ohmura et al. | 430/325 |
| 4,332,880 A | 6/1982 | Izu et al. | 430/272 |
| 4,404,257 A | 9/1983 | Olson | 428/412 |
| 4,457,855 A * | 7/1984 | Sudbury et al. | 8/679 |
| 4,491,508 A | 1/1985 | Olson et al. | 204/159.13 |
| 4,523,208 A | 6/1985 | Barzynski | 346/214 |
| 4,571,605 A | 2/1986 | Motosugi et al. | 346/216 |
| 4,655,970 A * | 4/1987 | Priester et al. | 552/255 |
| 4,689,171 A * | 8/1987 | Blunck et al. | 252/299.1 |

(Continued)

FOREIGN PATENT DOCUMENTS

AU    199657908 B2    12/1996

(Continued)

OTHER PUBLICATIONS

International Search Report, International Application No. PCT/US02/05050, International Filing Date: Feb. 6, 2002, Date of Mailing: Sep. 6, 2002, 8 pgs.

(Continued)

Primary Examiner—Vasu Jagannathan
Assistant Examiner—Vickey Ronesi (57) ABSTRACT

In one embodiment, a colored polymeric resin composition, comprises: a polymeric resin; and a 1,8-diaminoanthraquinone derivative having a purity of greater than or equal to about 90 wt % and having a Formula (VIII):

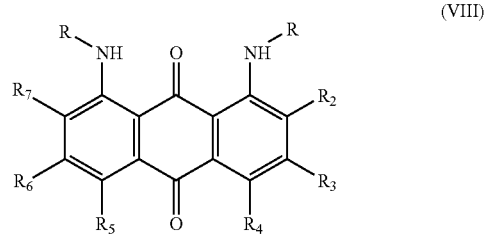

(VIII)

wherein $R_2$–$R_7$ are, individually, selected from the group consisting of a hydrogen atom, a hydroxyl group, an alkoxy group, an aryloxy group, an aliphatic group, an aromatic group, a heterocyclic group, a halogen atom, a cyano group, a nitro group, —$COR_9$, —$COOR_9$, —$NR_9R_{10}$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of hydrogen, an alkyl group containing 1 to 20 carbon atoms, a cycloalkyl group containing 3 to 20 carbon atoms, an allyl group containing 3 to 20 carbon atoms, a hydroxyl group, a 5-membered heterocyclic ring, and a 6-membered heterocyclic ring.

37 Claims, 3 Drawing Sheets

U.S. PATENT DOCUMENTS

| | | | |
|---|---|---|---|
| 4,735,631 A * | 4/1988 | Orelup | 44/428 |
| 4,807,220 A | 2/1989 | Miyai et al. | |
| 4,863,634 A * | 9/1989 | Claussen et al. | 252/299.1 |
| 4,891,800 A | 1/1990 | Sugaya | 369/275 |
| 4,983,505 A | 1/1991 | Higuchi et al. | |
| 4,997,903 A | 3/1991 | Okamoto | |
| 4,999,418 A * | 3/1991 | Krutak et al. | 528/272 |
| 5,368,988 A | 11/1994 | Shinkai et al. | 430/270 |
| 5,530,083 A | 6/1996 | Phelps et al. | |
| 5,558,808 A | 9/1996 | Smith et al. | 508/556 |
| 5,583,047 A | 12/1996 | Blinka et al. | 436/5 |
| 5,620,839 A | 4/1997 | Kawamoto et al. | 430/523 |
| 5,747,632 A * | 5/1998 | Adachi et al. | 528/196 |
| 5,753,413 A | 5/1998 | Nishida et al. | 430/270.13 |
| 5,815,484 A | 9/1998 | Smith et al. | 369/275.1 |
| 5,820,691 A | 10/1998 | Hartman | |
| 5,882,358 A | 3/1999 | Smith et al. | 8/527 |
| 6,011,772 A | 1/2000 | Rollhaus et al. | 369/286 |
| 6,013,145 A | 1/2000 | Amo et al. | |
| 6,117,284 A | 9/2000 | Mueller | 204/192.27 |
| 6,136,347 A | 10/2000 | Pollinger et al. | 424/495 |
| 6,165,299 A | 12/2000 | Guan et al. | |
| 6,168,844 B1 | 1/2001 | Takagishi et al. | 428/64.1 |
| 6,228,440 B1 | 5/2001 | Dailey et al. | 428/1.1 |
| 6,228,933 B1 | 5/2001 | Hiles | |
| 6,246,656 B1 | 6/2001 | Kawakubo et al. | |
| 6,338,933 B1 | 1/2002 | Lawandy et al. | 430/270.1 |
| 6,434,109 B2 | 8/2002 | Rollhaus et al. | |
| 6,475,588 B1 | 11/2002 | Schottland et al. | 428/64.1 |
| 6,475,589 B1 | 11/2002 | Pai-Paranjape et al. | 428/64.1 |
| 6,531,262 B1 | 3/2003 | Lawandy et al. | |
| 6,589,626 B2 | 7/2003 | Selinfreund et al. | |
| 6,590,856 B2 | 7/2003 | Tsukagoshi et al. | |
| 6,733,950 B2 | 5/2004 | Breitung et al. | |
| 6,756,103 B2 | 6/2004 | Thompson et al. | |
| 6,866,909 B2 | 3/2005 | Wisnudel et al. | |
| 2002/0102499 A1 | 8/2002 | Krieg-Kowald | |
| 2003/0002431 A1 | 1/2003 | Breitung et al. | 369/288 |
| 2003/0198892 A1* | 10/2003 | Ezbiansky et al. | 430/270.14 |
| 2003/0205323 A1* | 11/2003 | Ezbiansky et al. | 156/310 |
| 2003/0207206 A1 | 11/2003 | Olson et al. | |
| 2004/0014859 A1 | 1/2004 | Ezbiansky et al. | |
| 2004/0022986 A1 | 2/2004 | Van de Grampel et al. | |
| 2004/0043254 A1 | 3/2004 | Wisnudel et al. | |
| 2004/0152014 A1 | 8/2004 | Breitung et al. | |
| 2005/0025988 A1 | 2/2005 | Wisnudel et al. | |
| 2005/0051053 A1 | 3/2005 | Wisnudel et al. | |

FOREIGN PATENT DOCUMENTS

| | | |
|---|---|---|
| DE | 222205 | 3/1909 |
| EP | 0 455 585 A1 | 11/1991 |
| EP | 0 274 092 | 11/1992 |
| EP | 0 658 804 A2 | 6/1995 |
| EP | 0 658 804 A3 | 6/1995 |
| EP | 0 737 965 | 10/1996 |
| EP | 0 831 473 A | 3/1998 |
| GB | 958924 | 5/1964 |
| GB | 985970 A * | 3/1965 |
| GB | 1061948 | 3/1967 |
| JP | 55030605 | 3/1980 |
| JP | 57150152 | 9/1982 |
| JP | 57212634 | 12/1982 |
| JP | 58224448 | 12/1983 |
| JP | SHO 60-213938 | 4/1984 |
| JP | 59124891 | 7/1984 |
| JP | 59151346 | 8/1984 |
| JP | 60093983 | 5/1985 |
| JP | 60127542 | 7/1985 |
| JP | 60256944 | 12/1985 |
| JP | 61063489 | 4/1986 |
| JP | 61260435 | 11/1986 |
| JP | 63218398 | 9/1988 |
| JP | 02018728 | 1/1990 |
| JP | 02037539 | 2/1990 |
| JP | 04238086 | 8/1992 |
| JP | 5273691 | 10/1993 |
| JP | 05273691 | 10/1993 |
| JP | 2000195100 | 7/2000 |
| JP | 2001093190 | 4/2001 |
| JP | 60261046 | 12/2005 |
| PL | 170632 B1 | 7/1994 |
| WO | WO 96/39693 | 12/1996 |
| WO | WO 96/40850 | 12/1996 |
| WO | WO 98/11539 | 3/1998 |
| WO | WO 98/31011 | 7/1998 |
| WO | WO 98/41979 | 9/1998 |
| WO | WO 01/29828 | 4/2001 |
| WO | WO 02/29801 A | 4/2002 |
| WO | WO 02/49010 A2 | 6/2002 |
| WO | WO 02/099470 | 12/2002 |

OTHER PUBLICATIONS

Japanese Abstract, Patent No. 06-060422, Mar. 4, 1994, 7 pgs.
FlexPlay Coating Recipe, Aprilis, Inc. and FlexPlay Technologies, Inc., Richard Minns, Mar. 29, 2000, 3 pgs.
wysiwyg://119/http://www.matweb....cMaterialPrint.asp?bassnum=C, MatWeb.com, The Online Materials Database Overview—Polycarbonate, Optical Grade, 3 pgs.
ECMA, Standardizing Information and Communication Systems, Standard ECMA—267, 3rd Edition—Apr. 2001, 95 pgs.
John McMurry; Organic Chemistry Second Edition; p. 751 and pp. 530-533; 1984.
P. Seserko, et al. "Transparent Barrier Coatings by Electron Beam Evaporation-An Update". 41st Annual Technical Conference Proceedings. Soc. of Vacuum Coaters, Albuquerque, NM, USA (1998) ISSN 0737-5921. pp. 424-428.
Encyclopedia of Polymer Science and Technology, vol. 1, Interscience Publishers, John Wiley & Sons, Inc., 1964, pp. 246, et seq.
Chemical Abstracts, vol. 126, No. 20, May 19, 1997, Columbus, Ohio, Abstract No. 263931, Antoni et al., "Preparation of 4-phenylbenzophenone", 1 page.
Lord, W. Martin and A. Peters, School of Colour Chemistry, The University, Branford BD7 1DP, "New Intermediates and Syestuffs for Synthetic Fibres. Part VI. 1-Aryl-aminoanthrquinones", J. Chemical Society, 1973, pp. 2305-2308.
JP 2001093190 A; Publication Date: Apr. 6, 2001 (translation of abstract only).
JP 2000195100 A; Publication Date: Jul. 14, 2000 (translation of abstract only).
JP 57150152 A; Publication Date: Sep. 16, 1982 (translation of abstract only).
JP 59151346; Publication Date: Aug. 29, 1984 (translation of abstract only).
JP 05273691; Publication Date: Oct. 22, 1993 (translation of abstract only).
JP 04238089 A; Publication Date: Aug. 26, 1992 (translation of abstract only).
JP 02018728 A; Publication Date: Jan. 23, 1990 (translation of abstract only).
JP 61260435 A; Publication Date: Nov. 18, 1986 (translation of abstract only).
JP 02037539; Publication Date: Feb. 7, 1990 (translation of abstract only).
JP 59124891 A; Publication Date: Jul. 1, 1984 (translation of abstract only).
JP 58224448 A; Publication Date: Dec. 26, 1983 (translation of abstract only).
JP 57212634; Publication Date: Dec. 27, 1982 (translation of abstract only).
JP 63218398 A; Publication Date: Sep. 12, 1988 (translation of abstract only).

JP 61063489 A; Publication Date: Apr. 1, 1986 (translation of abstract only).

JP 60127542 A; Publication Date: Jul. 8, 1985 (translation of abstract only).

JP 60256944 A; Publication Date: Dec. 18, 1985 (translation of abstract only).

JP 60261046 A; Publication Date: Dec. 24, 1985 (translation of abstract only).

Sax, J.E., et al "Permeabilities of Radiation Cured Materials", International Journal of Radiation Applications Instrumentation, Part C, Radiation Physics and Chemistry, vol. 31, Issues 4-6, 1988k, pp. 887-896.

Larson, E.G., et al. "Properties of Radiation Cured Coatings", International Journal of Radiation Applications Instrumentation, Part C, Radiation Physics amd Chemistry, vol. 30, Issue 1, 1987, pp. 11-15.

Arient, J. and Slavik, V., Collect. Czech Commun., 34, Feb. 13, 1969, 3582, "Anthraquinone Dyes- Cyclisation of 1-Phenylaminoanthraquinone Derivative in Aluminumchlordie Melt." (translation).

U.S. Appl. No. 10/619,642; Filed Jul. 15, 2003; Limited Play Optical Storage Medium, Method for Making the Same; 80 pages.

* cited by examiner

FIG. 3

1,8-bis(cyclohexylamino) anthraquinone

COLORED POLYMERIC RESIN COMPOSITION WITH 1,8-DIAMINOANTHRAQUINONE DERIVATIVE, ARTICLE MADE THEREFROM, AND METHOD FOR MAKING THE SAME

BACKGROUND

Colored polymeric resin articles are utilized in all areas of commerce ranging from automotive and aerospace products (e.g., dashboards, interior components, seats, tubing, under the hood components such as fluid reservoirs and the like, light lenses, and the like), medical articles (e.g., tubing, oxygen masks, contact lenses, eye glasses, monitors, sensors, and the like) and toys, to telecom (e.g., cellular phone covers and housings, PDAs (personal data assistants, also referred to as pocket or handheld computers) 2-way radios, transmitters and receivers), consumer electronics (e.g., radios, portable CD players), and business equipment (e.g., computers, printers, fax machines). Colors enhance the aesthetics, salability and often the useful life of an article, and can help distinguish brands.

Some colorants, however, can adversely affect the ability to cure through the polymeric resin. As a result, colors, e.g., those in the red-violet portion of the spectrum (i.e., blue-shaded red colorants), have had limited commercial use in such applications. There remains a need and desire to discover colorants that reside in the red-violet portion of the spectrum, that are compatible with polymeric resins and are heat stable enough to sustain the heat involved in the processing (e.g., extrusion, molding, thermoforming) of such resins, and which yield transparent compositions allowing the desired curing in the UV region (at or around about 365 nm).

In some applications, transmission in the UV region is desired to allow for data transmission using for instance near visible light-emitting diodes ("LEDs" in the 370 nanometer (nm) to 390 nm range). Colors such as those in the red-violet portion of the spectrum are needed to filter the received wavelengths and minimize the noise from outside light thus providing a better signal reception. In other systems, such as optical media (e.g. DVD), a good transmission at about 650 nm is also desired in combination with UV curability.

SUMMARY

Disclosed herein are embodiments of colored polymeric resins, articles made therefrom, and methods for making the same. In one embodiment, a colored polymeric resin composition comprises: a polymeric resin and a 1,8-anthraquinone derivative having a purity of greater than or equal to about 90 wt % and having a Formula (VIII):

(VIII)

wherein $R_2$–$R_7$ are, individually, selected from the group consisting of a hydrogen atom, a hydroxyl group, an alkoxy group, an aryloxy group, an aliphatic group, an aromatic group, a heterocyclic group, a halogen atom, a cyano group, a nitro group, —$COR_9$, —$COOR_9$, —$NR_9R_{10}$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of hydrogen, an alkyl group containing 1 to 20 carbon atoms, a cycloalkyl group containing 3 to 20 carbon atoms, an allyl group containing 3 to 20 carbon atoms, a hydroxyl group, a 5-membered heterocyclic ring, and a 6-membered heterocyclic ring.

In another embodiment, the colored polymeric resin composition comprises: a polymeric resin; and a 1,8-anthraquinone derivative having a Formula (VIII):

(VIII)

wherein $R_2$–$R_7$ are, individually, selected from the group consisting of a hydrogen atom, a hydroxyl group, an alkoxy group, an aryloxy group, an aliphatic group, an aromatic group, a heterocyclic group, a halogen atom, a cyano group, a nitro group, —$COR_9$, —$COOR_9$, —$NR_9R_{10}$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of hydrogen, an alkyl group containing 1 to 20 carbon atoms, a cycloalkyl group containing 3 to 20 carbon atoms, an allyl group containing 3 to 20 carbon atoms, a hydroxyl group, a 5-membered heterocyclic ring, and a 6-membered heterocyclic ring. An article formed from this composition has a hue angle value of less than or equal to about 330 degrees (when used at a loading of 0.01 pph at an article thickness of 3.2 mm).

In one embodiment, the method of making a colored polymeric article comprises: combining the polymeric resin with the 1,8-anthraquinone derivative and forming an article therefrom.

The above described and other features are exemplified by the following figures and the detailed description.

BRIEF DESCRIPTION OF THE DRAWINGS

Referring now to the figures, which are exemplary, not limiting:

FIG. 1 represents a graphical representation of extinction coefficients (i.e., absorptivity) expressed in $mol^{-1} \cdot cm^{-1} \cdot L$ versus wavelength for both 1,8-bis(cyclohexylamino)

anthraquinone and Solvent Red 52 in a methylene chloride solution (concentration: 0.062 millimol per liter);

DETAILED DESCRIPTION

Disclosed herein is a colored polymeric resin comprising a 1,8-anthraquinone derivative of red-violet colorants having a hue angle (CIE 1976 LCh color space, D65 illuminant, 10 degree observer) of less than or equal to about 340 degrees, with a hue angle of less than or equal to about 330 degrees preferred, and less than or equal to about 320 degrees more preferred. Unless specified otherwise, hue angle is determined by measuring the sample in transmission mode using a spectrophotometer with a sphere geometry (following ASTM E1164 and ASTM E1348 standards and practices) and expressing the color coordinates in the CIE 1976 LCh color space for a D65 illuminant and a 10 degree observer. The 1,8-anthraquinone derivative preferably also has enough heat stability at 600° F. (315° C.) to be used in polycarbonate compositions, and a purity of greater than or equal to about 95%. For example, the 1,8-anthraquinone derivative is preferably 1,8-bis(cyclohexylamino) anthraquinone. 1,8-bis(cyclohexylamino) anthraquinone has unique properties, including being highly curable at wavelengths of about 345 nm to about 445 nm (i.e., has an extinction coefficient (mol$^{-1}$·cm$^{-1}$·L) of less than or equal to about 3,000 at wavelengths of about 345 nm to about 470 nm), while being of an extreme blue shade of red-violet such that the resulting article has almost a violet color and is capable of being efficiently UV cured.

This 1,8-anthraquinone derivative preferably has a purity of greater than or equal to about 90%, greater than or equal to about 95% being preferred and greater than or equal to about 99% being most preferred. In one embodiment, the 1,8-anthraquinone derivative is characterized by a maximum absorption located between about 530 and about 610 mm when measured in methylene chloride solution. In addition, the extinction coefficients at 365 mm and 650 mm (measured in methylene chloride solution) is less than or equal to about 1000 Mol$^{-1}$·cm$^{-1}$·L. In another embodiment, the extinction coefficients at 365 and 650 nm represent less than about 10% of the extinction coefficient at the maximum absorption, and preferably less than about 5%. In one embodiment, the ratio of extinction coefficient at 600 nm to 365 nm is greater than or equal to about 5, greater than or equal to about 10 being preferred and greater than or equal to about 20 even more preferred. The 1,8-anthraquinone derivative has enough heat stability to be compounded in polycarbonate compositions and molded at 600° F. (315° C.) even with a material residence time of 5 minutes in the barrel of the molding machine.

Figure 1:
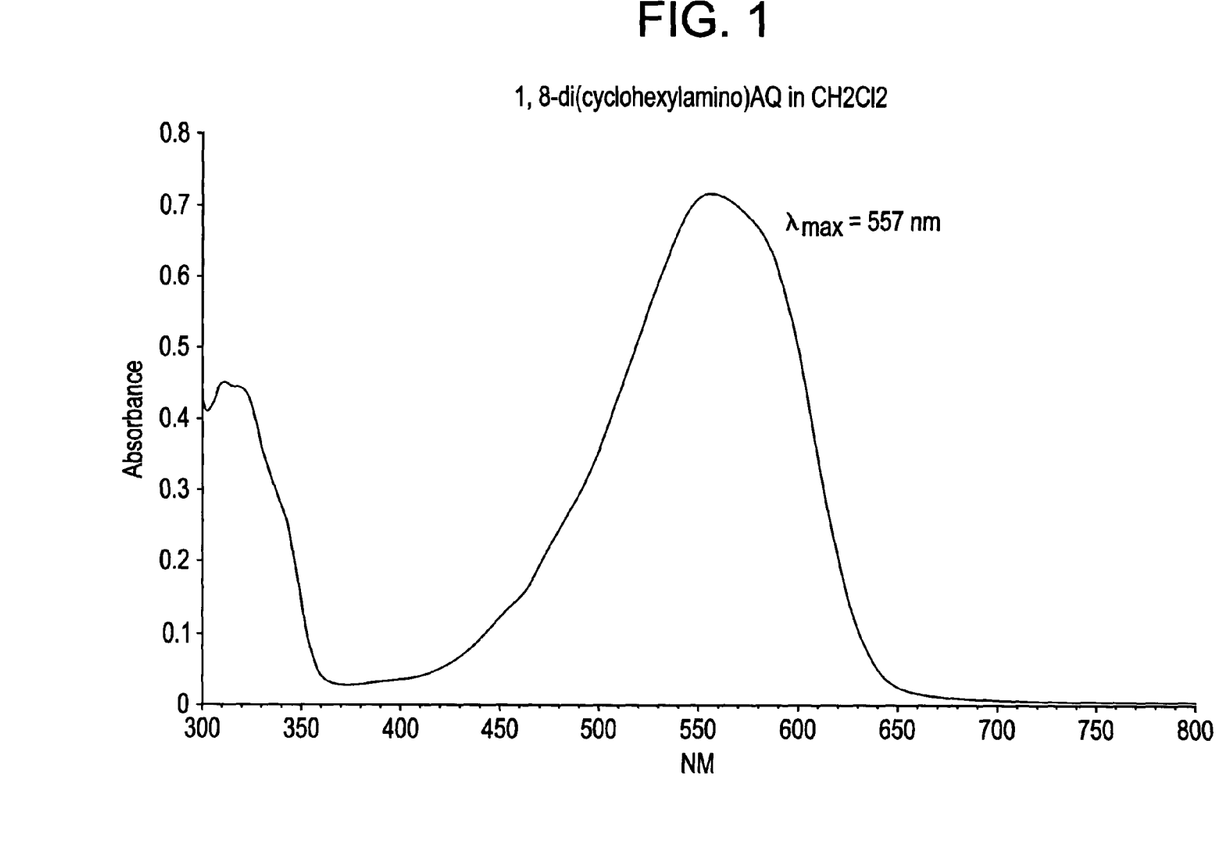
Figure 2:
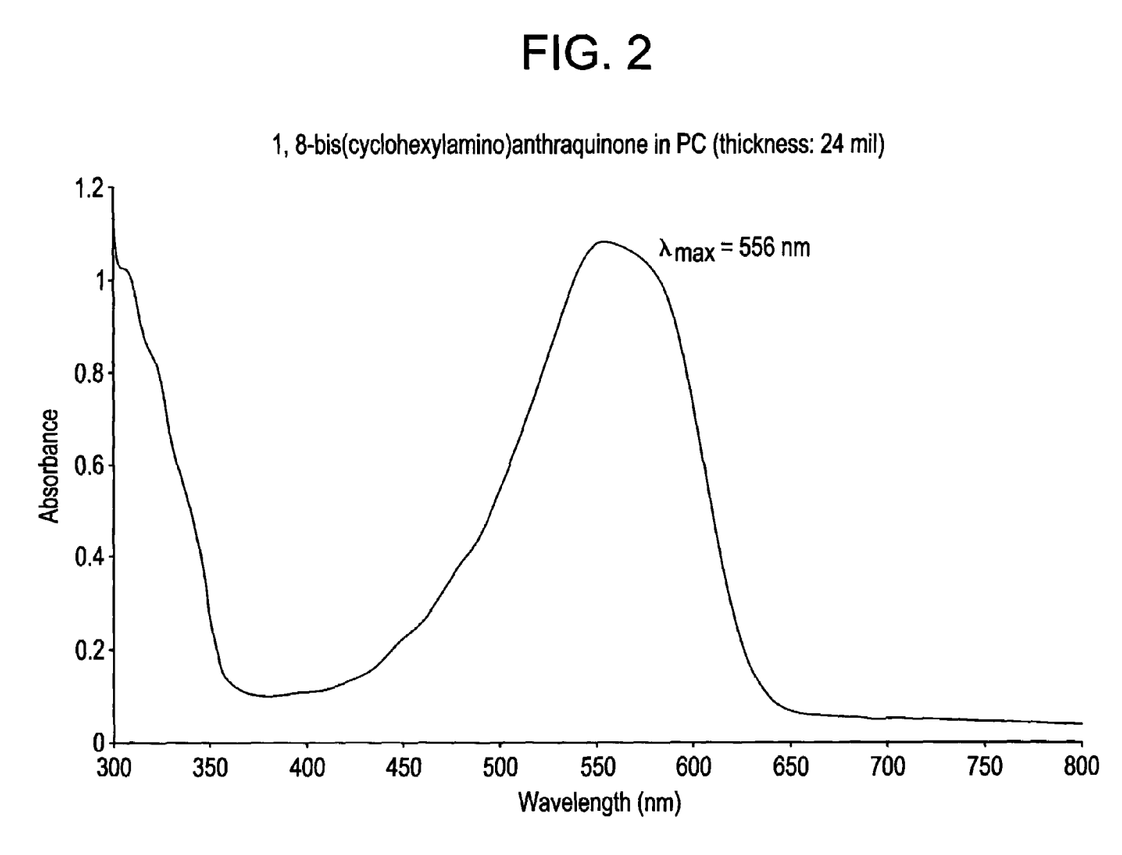
FIG. 2 is a graphical illustration of absorbance versus wavelength for 1,8-bis(cyclohexylamino) anthraquinone in polycarbonate (PC) at a thickness of 0.6 millimeters with a maximum absorbance at 556 nm.

As can be seen from FIGS. 1 and 2, the 1,8-bis(cyclohexylamino) anthraquinone has the unique property of having an extinction coefficient of less than or equal to about 3,000 at wavelengths of about 345 nanometers (nm) to about 470 mm with an extinction coefficient greater than or equal to about 10,000 at wavelengths of about 535 nm to about 590 nm.

The preferred anthraquinone derivative properties can further be described in relation to a curing index. The curing index was calculated according to the following Equation 1:

$$\text{Curing Index} = \frac{\sum_{\lambda=330}^{\lambda=450} \%T_{color}(\lambda) \times \text{Lamp Energy}(\lambda)}{\sum_{\lambda=330}^{\lambda=450} \%T_{clear}(\lambda) \times \text{Lamp Energy}(\lambda)} \quad (1)$$

where:

% $T_{color}(\lambda)$ represents the light transmission at each wavelength $\lambda$ (nm) of the article including the anthraquinone derivative.

% $T_{clear}(\lambda)$ represents the light transmission at each wavelength $\lambda$ (nm) of a reference article where there is no anthraquinone derivative (e.g., clear polycarbonate article).

$\lambda$ represents the wavelength (nm).

Lamp Energy ($\lambda$) represents the efficient lamp energy at each wavelength calculated as explained in Example 10.

A curing index of greater than or equal to about 0.5 can be employed, with greater than or equal to about 2 preferred, greater than or equal to about 5 more preferred, greater than or equal to about 10 even more preferred, and greater than or equal to about 20 especially preferred.

It is desirable for the anthraquinone derivative, and preferably for the article comprising the derivative, to have an absorbance ratio of 600 nm to 365 nm (or 600 nm to 400 nm) of greater than or equal to about 2, preferably greater than or equal to about 3, more preferably greater than or equal to about 5, even more preferably greater than or equal to about 10, and yet even more preferably greater than or equal to about 20. Unless set forth otherwise, all absorbance ratios are measured using a double beam spectrophotometer at a dye concentration yielding a maximum absorption between 0.8 and 1.2 units for a 1 centimeter (cm) path length.

Polymeric resins that may be used to form the article may be amorphous, crystalline, and semi-crystalline thermoplastic materials such as, but not limited to polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride, polytetrafluoroethylenes, or the like, or combinations comprising at least one of the foregoing polymeric resins.

If the application requires optical transparency (e.g., case of an optical disk), then the substrate is preferably amorphous and optically transparent. An example would be a substrate located on the read side because it should allow laser transmission without creating interferences (e.g., light scattering, significant light absorption or the like). In a single sided DVD format such as DVD-5 or DVD-9, the opposite substrate to the read side may be opaque. In such case, the non-read side can be amorphous, crystalline, or semi-crystalline and without regard to optical transparency at the laser wavelength.

A preferred polymeric resin that may be utilized is a polycarbonate. As used herein, the terms "polycarbonate", "polycarbonate composition", and "composition comprising aromatic carbonate chain units" includes compositions having structural units of the Formula (I):

(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the Formula (II):

$-A^1-Y^1-A^2-$ (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being bisphenol (OH-benzene-benzene-OH). The bridging radical $Y^1$ can be a hydrocarbon group or a saturated hydrocarbon group such as methylene, cyclohexylidene or isopropylidene.

Polycarbonates may be produced by the interfacial reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general Formula (III) as follows:

(III)

wherein $R^a$ and $R^b$ each independently represent hydrogen, a halogen atom, or a monovalent hydrocarbon group; p and q are each independently integers from 0 to 4; and $X^a$ represents one of the groups of Formula (IV):

(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by Formula (III) includes the bis(hydroxyaryl)alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)$_n$-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis (hydroxyaryl)cycloalkane series such as, 1,1-bis(4-hydroxyphenyl)cyclopentane, 1,1-bis(4-hydroxyphenyl) cyclohexane, and the like; and the like, as well as combinations comprising at least one of the foregoing bisphenol compounds.

Other bisphenol compounds that may be represented by Formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, and the like; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl) sulfoxides, such as, 4,4'-dihydroxy diphenyl sulfoxides, 4,4'-dihydroxy-3,3'-dimethyl diphenyl sulfoxides, and the like; bis(hydroxy diaryl)sulfones, such as 4,4'-dihydroxy diphenyl sulfone, 4,4'-dihydroxy-3,3'-dimethyl diphenyl sulfone, and the like; and the like, as well as combinations comprising at least one of the foregoing bisphenol compounds.

Other bisphenol compounds that may be utilized in the polycondensation of polycarbonate are represented by the Formula (V):

(V)

wherein, $R^f$, is a halogen atom of a hydrocarbon group having 1 to 10 carbon atoms or a halogen substituted hydrocarbon group; n is a value from 0 to 4. When n is at least 2, R$^f$ may be the same or different. Examples of bisphenol compounds that may be represented by the Formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like; and the like, as well as combinations comprising at least one of the foregoing bisphenol compounds.

Bisphenol compounds such as 2,2, 2', 2'-tetrahydro-3, 3, 3', 3'-tetramethyl-1,1'-spirobi-[1H-indene]-6,6'-diol represented by the following Formula (VI) may also be used.

(VI)

The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Siloxane-polycarbonate block copolymers have been recognized for their low temperature ductility and flame retardancy and may also be utilized as the matrix for incorporating the phosphorescent pigments. These block copolymers can be made by introducing phosgene under interfacial reaction conditions into a mixture of a dihydric phenol, such as BPA, and a hydroxyaryl-terminated polydiorganosiloxane. The polymerization of the reactants can be facilitated by use of a tertiary amine catalyst.

Some of the hydroxyaryl-terminated polydiorganosiloxanes that may be used include phenol-siloxanes of the Formula (VII)

(VII)

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer greater than or equal to 1, preferably greater than or equal to about 10, more preferably greater than or equal to about 25 and most preferably greater than or equal to about 40. It is also preferred to have n be an integer less then or equal to 1000, preferably less than or equal to 100, more preferably less than or equal to about 75 and most preferably less than or equal to about 60. In one embodiment n is less than or equal to 50. Particularly preferred hydroxyaryl-terminated polydiorganosiloxanes are those where $R^2$ is methyl and R is hydrogen or methoxy and located in the ortho position to the phenolic substituent and where $R^1$ is propyl and located ortho or para to the phenolic substituent.

Some of the radicals included within R in the above Formula (VII) are hydrogen, halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^1$ are, for example, dimethylene, trimethylene and tetramethylene. Radicals included within $R^2$ are, for example, $C_{(1-13)}$ alkyl radicals, haloalkyl radicals such as trifluoropropyl and cyanoalkyl radicals; aryl radicals such as phenyl, chlorophenyl and tolyl. $R^2$ is preferably methyl, or a mixture of methyl and trifluoropropyl, or a mixture of methyl and phenyl.

The siloxane-polycarbonate block copolymers have a weight-average molecular weight (Mw, measured, for example, by Gel Permeation Chromatography, ultra-centrifugation, or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds to about 10 to about 100 chemically bound organosiloxane units. They can be prepared such as described in for example U.S. Pat. No. 5,530,083, incorporated herein by reference in its entirety.

Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 wt %, based upon the total weight of the substrate.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

Preferably, the weight average molecular weight of the polycarbonate is about 5,000 to about 100,000 atomic mass units (amu). Within this range, it is desirable to have a weight average molecular weight of greater than or equal to about 10,000 amu, preferably greater than or equal to about 15,000 amu. Also desirable is a molecular weight of less than or equal to about 65,000 amu, and more preferably less than or equal to about 35,000 atomic mass units. It is noted, however, that in some applications, e.g., in optical media resins, the weight average molecular weight of the polycarbonate is preferably less than or equal to about 20,000 amu, with about 5,000 amu to about 20,000 amu more preferred.

The anthraquinone derivatives may be represented by the Formula (VIII):

(VIII)

wherein $R_2$–$R_7$ are, individually, selected from the group consisting of a hydrogen atom, a hydroxyl group, an alkoxy group, an aryloxy group, an aliphatic group, an aromatic group, a heterocyclic group, a halogen atom, a cyano group, a nitro group, —$COR_9$, —$COOR_9$, —$SR_9$, —$NR_9R_{10}$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group, while R is hydrogen, an alkyl group containing 1 to 20 carbon atoms (e.g., methyl, ethyl, n-butyl, isopropyl, 2-ethylhexyl, n-decyl, n-octadecyl), a cycloalkyl group containing 3 to 20 carbon atoms (e.g., cyclopentyl, cyclohexyl), an allyl group containing 3 to 20 carbon atoms, which may contain a substituent(s) including, for example, a halogen atom (e.g., F, Cl, Br, I), a 5- or 6-membered heterocyclic ring, or the like. Some examples of the above 1,8-anthraquinone derivatives include: 1,8-bis(cyclohexylamino) anthraquinone; 1,8-bis(isopropylamino) anthraquinone; 1,8-bis(2-ethylhexylamino) anthraquinone; 1,8-bis(N,N-diethylamino-propylamino) anthraquinone; and 1,8-bis(N,N-diethylamino-ethylamino) anthraquinone, and their derivatives, and the like, as well as reaction products and combinations comprising at least one of the foregoing, with 1,8-bis(cyclohexylamino) anthraquinone preferred.

It is desirable for the aforementioned anthraquinone derivative to have a violet shade. Preferably, such 1,8 anthraquinone derivatives will have a maximum light absorption in the range of about 530 and about 610 nm, with a maximum absorption in the range of about 540 to about 600 nm preferred, with the range of about 540 nm to about 590 nm even more preferred. Maximum absorption within this range enables use in various application such as DVD applications, and efficient transmission of 650 nm lasers in optical sensors and detectors, as well as others. In general, it is desirable for the 1,8-anthraquinone derivatives to have an extinction coefficient of greater than or equal to about 1,500 liter per mole centimeter ($mol^{-1} \cdot cm^{-1} \cdot L$), preferably greater than or equal to about 3,000 $mol^{-1} \cdot cm^{-1} \cdot L$, more preferably greater than or equal to about 4,500 $mol^{-1} \cdot cm^{-1} \cdot L$, and most preferably greater than or equal to about 6,000 $mol^{-1} \cdot cm^{-1} \cdot L$ at a wavelength of 600 nm. It is also desirable for the 1,8-anthraquinone derivative to have and extinction coefficient of less than about 1,000 $mol^{-1} \cdot cm^{-1} \cdot L$, preferably less than or equal to about 800 $mol^{-1} \cdot cm^{-1} \cdot L$, and more preferably less than or equal to about 600 $mol^{-1} \cdot cm^{-1} \cdot L$, at a wavelength of about 650 nm. In one embodiment, it is also desirable for the 1,8-anthraquinone to have an extinction coefficient at 650 m that is less than or equal to about 10% of the extinction coefficient at the maximum absorption. Unless otherwise noted, all extinction coefficients are also measured using a double beam spectrophotometer at a dye concentration yielding a maximum absorption between 0.8 and 1.2 units for a 1 centimeter (cm) path length.

As understood by artisans, the 1,8-anthraquinone derivatives can be formed in various fashions. One method comprises using amine condensation. When synthesized using a condensation of an amine (e.g., cyclohexylamine, or the like) with a 1,8-dihalogenated anthraquinone, the raw materials used (such as 1,8-dichloroanthraquinone) are selected by reaction of pure raw materials with a minimum purity of greater than or equal to about 95%. Preferably, the purity is greater than or equal to about 97%, with greater than or equal to about 99% more preferred. As typical impurities include essentially the monohalogenatedanthraquinone (e.g., monochloroanthraquinone), the possible amount of 1,5-dihalogenated anthraquinone that could be present is negligible (e.g., 1,5-dichloroanthraquinone) is. As a result, the reaction with the amine (e.g., the cyclohexylamine) does not yield a detectable amount of 1,5-bis(cyclohexylamino) anthraquinone. Preferably, this reaction is carried out in the presence of an excess of cyclohexylamine and optionally using a catalyst to maximize the conversion of the 1,8-dichloroanthraquinone to 1,8-bis(cyclohexylamino)anthraquinone. The reaction product is then collected by filtration and thoroughly washed with water and methanol. Optionally, the pH of the water might be adjusted using diluted acids or bases (e.g. $H_2SO_4$, HCl, $HNO_3$, NaOH, KOH) in order to further remove the residual cyclohexylamine and to attain the maximum purity.

Without being limited to theory, due to the nature of the chromophore of the aforementioned red-violet anthraquinone derivatives, a higher extinction coefficient is generally achieved at a wavelength of about 600 nm while a lower extinction coefficient is achieved at a wavelength of about 650 nm with a maximum absorption located at a wavelength of greater than or equal to about 530 nm, preferably greater than or equal to about 540 nm, and more preferably greater than or equal to about 550 nm, when in a solution of methylene chloride (also referred to as dichloromethane or $CH_2Cl_2$).

It is generally desirable to add the anthraquinone derivative to the polymeric resin in an amount sufficient to achieve the desired light transmission/absorption characteristics in the final application. Typically, an amount of about 0.001 wt % to about 5.0 wt % or so, anthraquinone derivative can be employed based upon the total weight of the portion of the article comprising the colorant, wherein the anthraquinone derivative comprises greater than or equal to about 95 wt % 1,8-anthraquinone derivative, and more preferably 1,8-bis (cyclohexylamino) anthraquinone, based upon the total weight of anthraquinone derivative. Within this range, an amount of anthraquinone derivative of less than or equal to about 3 wt %, with less than or equal to about 1 wt % is preferred, less than or equal to about 0.4 wt % more preferred for most anthraquinone derivatives. Also preferred within this range is an amount of anthraquinone derivative of greater than or equal to about 0.05 wt %, with greater than or equal to about 0.07 wt % more preferred, and greater than or equal to about 0.1 wt % especially preferred. It is further preferred that the anthraquinone derivative comprise greater than or equal to about 97 wt % 1,8-anthraquinone derivative, and more preferably greater than or equal to about 99 wt %, based upon the total weight of anthraquinone derivative. As can be seen from the examples below, 1,5-anthraquinone impurities will change the light absorption characteristics of the colorant. When the amount of 1,5-anthraquinone impurities increases, the extinction coefficient at 550 nm and above decreases whereas the extinction coefficient at about 500 nm increases. The 1,8-bis(cyclohexylamino)anthraquinone has demonstrated a better heat stability at 600° F. (315° C.) than the 1,5-derivative. It is therefore desirable to have a high purity of 1,8-derivative in order to retain such heat stability benefits.

In some applications, an amount of about 0.001 wt % to about 80.0 wt % or so, anthraquinone derivative can be employed based upon the total weight of the portion of the article comprising the colorant, wherein the anthraquinone derivative comprises greater than or equal to about 95 wt % 1,8-anthraquinone derivative, and more preferably 1,8-bis (cyclohexylamino) anthraquinone, based upon the total weight of anthraquinone derivative.

Formation of an article comprising a polymeric resin and the 1,8-anthraquinone derivative may generally be added to the extruder at the feed throat. In one embodiment, the polymeric resin is added to the extruder at the feed throat, while the anthraquinone derivative may be added downstream of the feed throat, for example in the form of a colorant masterbatch. While the polymeric resin may be blended with the anthraquinone derivative in the extruder, it may also be desirable to blend the polymeric resin with the anthraquinone derivative directly in a molding machine (e.g., forming the composition insitu with the forming of the article (colorant is added to the polycarbonate in the formation of the article)). In other words, the 1,8-anthraquinone derivative can be employed as colorants in masterbatches, or single pigment dispersions in resin or other binding component. In addition, the 1,8-anthraquinone derivative can be used in the finishing step (use of masterbatch, liquid dying, single colorant dispersion, direct mixing with pellets (e.g., polymeric resin pellets), and the like), for instance directly at the molding machine or film/sheet extrusion line, and the like.

The following examples, which are meant to be exemplary, not limiting, illustrate compositions and methods of manufacturing related to the various embodiments of the limited play data storage media using various materials and apparatus.

EXAMPLES

For Examples 1–8, the nuclear magnetic resonance (NMR) spectra were recorded using Bruker 300 MHz Avance spectrometer and the ultraviolet (UV)-visual (VIS) spectral measurement was done using Perkin-Elmer Lambda 900 UV/VIS/NIR (near infrared) spectrophotometer. Methylene chloride was employed as the solvent for the UV-VIS spectral measurement. High performance liquid chromatography (HPLC) analysis has been performed on the instrument Agilent 1100. All the melting points were recorded using the instrument Electrothermal MEL-TEMP 3 and are uncorrected. The extinction coefficients were calculated with the formula:

$$\varepsilon = \frac{A}{BC}$$

where:
  $\varepsilon$=extinction coefficient
  A=absorbance
  B=path length in cm
  C=concentration (molar concentration in moles per liter)

Example 1

This example details the synthesis of 1,5-bis(isopropylamino) anthraquinone. 3.00 grams (g) (0.011 moles (mol)) 1,5-dichloroanthraquinone, 30 milligrams (mg) copper powder, 30 mg copper(I) iodide and 20 milliliter (ml) (0.235 moles) isopropyl amine were added to 30 ml of ethylene glycol and the resulting suspension was heated to 160° C. in a sealed vessel, which was kept in an oil bath. The heating was continued for 16 hours at 160° C., after which the heating was discontinued and the vessel was allowed to attain room temperature. This was followed by the addition of 20 ml of methanol into the vessel and the contents were stirred for thirty minutes at room temperature. The resulting mixture was then poured slowly into 50 grams (g) of 15% (weight/volume (wt/vol)) ice-cold (i.e., about 5° C.) HCl solution. The precipitate was then filtered, washed free of acid using water and dried under vacuum at 100° C. The yield was 3.00 g. The crude product thus obtained was purified by column-chromatography using an eluent system containing 80% of n-hexane and 20% ethyl acetate. An 80% purity was obtained as determined using HPLC. The product was characterized using proton NMR ($^1$H NMR) spectroscopy (300 megahertz (MHz), deuterated chloroform ($CDCl_3$)) chemical shift ($\delta$) 1.36 (doublet (d), 12 protons (H)), $\delta$ 3.86 (multiplet (m), 2H), $\delta$ 6.99 (d, 2H), $\delta$ 7.53 (m, 4H), $\delta$ 9.75 (proton attached to the nitrogen (NH)).

Example 2

This example details the synthesis of 1,5-bis-(–2-N,N-diethylamino-ethylamino) anthraquinone. A mixture containing 5.50 g (0.02 mole) 1,5-dichloro anthraquinone, 60 mg copper powder, and 20 g (0.17 mole) of N,N-diethyl-ethylenediamine was heated to about 120° C. to about 125° C. at atmospheric pressure (about $10^5$ Pascals (Pa)) for a period of 5 hours. The resulting solution was then cooled to 50° C., following which it was triturated with 40 ml of methanol and stirred for an additional hour at 50° C. The product mass thus obtained was then poured slowly into 100 ml of ice-cold water. The precipitated product was then filtered, washed with water and dried overnight at 50° C. The yield was 6.50 g. A 98% purity was obtained as determined using HPLC. The product was characterized by $^1$H NMR spectroscopy (300 MHz, $CDCl_3$) δ 1.08 (triplet (t), 12H), δ 2.65 (quadruplet (q), 8H), δ 2.82 (m, 4H), δ 3.40 (m, 4H), δ 6.98 (d, 2H), δ 7.54 (m,4H), δ 9.75 (NH).

Example 3

This example details the synthesis of 1,8-bis(cyclohexylamino) anthraquinone. A mixture containing 28.00 g (0.101 mol) 1,8-dichloroanthraquinone, 0.3 g copper powder, and 280 ml (2.45 mol) of cyclohexylamine was heated to 160° C. at atmospheric pressure for period of 15 hours. The resulting solution was then cooled to 60° C., following which it was triturated with 150 ml of methanol and stirred for an additional hour at that temperature. The product mass thus obtained was then poured slowly into 1,000 ml of 15% (wt/vol) ice-cold HCl solution. The product that precipitated was then filtered, washed free of acid using water and dried under vacuum at 100° C. The yield was 37.00 g.

The crude product thus obtained was then suspended in 200 ml methanol and refluxed for an hour, after which the mixture was cooled to room temperature. It was filtered, washed with 20 ml of cold methanol (10° C.), and dried under suction. The performance of TLC (thin layer chromatography) at this stage using an eluent system consisting of 90 vol % petroleum ether and 10 vol % ethyl acetate, indicated the presence of a small proportion of the mono-condensed product. The methanol treatment was repeated to remove the mono substituted product completely. The product thus obtained was then dissolved in 4 liters (L) methylene chloride in lots, heated to reflux on each occasion, filtered through a bed of celite (diatomaceous earth) using a G-2 sintered funnel. The resulting solution was evaporated under reduced pressure to yield 34 g of the pure product; i.e., 98% purity determined by HPLC. The product was characterized by $^1$H NMR spectroscopy (300 MHz, deuterated dichloromethane ($CD_2Cl_2$)) δ 1.33–2.12 (m, 20H), δ 3.55 (m, 2H), δ 7.11 (d, 2H), δ 7.48 (m, 4H), δ 9.73 (NH).

Example 4

This example details the synthesis of 1,8-bis(isopropylamino) anthraquinone. A mixture containing 3.00 g (0.011 moles) 1,8-dichloroanthraquinone, 30 mg copper powder, 30 mg of copper(I) iodide and 25 ml (0.29 moles) of isopropyl amine were added to 20 ml (0.34 moles) ethylene glycol and the resulting suspension was heated to 160° C. in a sealed vessel for 15 hours. The resulting solution was then cooled to room temperature (about 23° C.), and the contents were poured slowly into 100 ml of 15% ice-cold acetic acid solution. The product that precipitated was then filtered, washed free of acid and dried under vacuum at 100° C. The yield was 3.00 g. A portion of the sample was then subjected to column-chromatography using a solvent mixture containing 80 volume percent (vol %) of n-hexane and 20 vol % ethyl acetate as the eluent system to yield the product in the pure form. A yield of 34 g was obtained at a 93% purity as determined by HPLC. The product was characterized by $^1$H NMR spectroscopy (300 MHZ, $CDCl_3$) δ 1.39 (d, 12H), δ 3.86 (m, 2H), δ 7.07 (d, 2H), δ 7.50 (m, 4H), δ 9.73 (NH).

Example 5

This example details the synthesis of 1,8-bis(2-ethylhexylamino) anthraquinone. 4.00 g (0.014 moles) of 1,8-dichloro anthraquinone, 60 mg of copper powder and 10 g (0.077 moles) of 2-ethylhexylamine were added to 35 ml of ethylene glycol in a flask and the resulting suspension was heated to 160° C. for 16 hours, after which the contents of the flask were allowed to cool to room temperature followed by the addition of 30 ml of methanol and stirring for 30 minutes. The resulting mixture was then poured slowly into 50 g of 15% ice-cold HCl solution. The resulting precipitate was filtered, washed free of acid, and dried under vacuum at 100° C. The yield was 3.50 g. The crude product was then purified by column-chromatography using an eluent system consisting of 80 vol % n-hexane and 20 vol % ethyl acetate. A 93% purity was obtained as determined using HPLC. The product was characterized by $^1$H NMR spectroscopy (300 MHz, deuterated dimethylsulfoxide ($DMSOD_6$)) δ 0.95 (m, 12H), δ 1.35–1.72 (m, 18H), δ 3.22 (m, 4H), δ 7.05 (d, 2H), δ 7.50 (m, 4H), δ 9.73 (NH).

Example 6

This example details the synthesis of 1,8-bis-(3-N,N-dimethylamino-propylamino) anthraquinone. A mixture containing 5.00 g (0.018 mol) 1,8-dichloro anthraquinone, 50 mg copper powder, and 40 g (0.39 mol) of N,N-dimethylamino-3-propylamine was heated to 120° C. at atmospheric pressure for a period of 3 hours. The resulting solution was then cooled to 60° C., triturated using 20 ml of methanol and stirred for 1 hour at that temperature. The product mass thus obtained was then poured slowly into 200 ml of ice cold water. The precipitate thus obtained was then filtered to get 2 g of the product. A portion of the crude sample was then subjected to column-chromatography using a solvent mixture containing 80 vol % of n-hexane and 20 vol % ethyl acetate as the eluent system to yield the product in the pure form. A 98% purity was obtained as determined using HPLC. The product was characterized by $^1$H NMR spectroscopy (300 MHZ, $CDCl_3$) δ 1.94 (m, 4H), δ 2.29 (singlet (s), 12H), δ 2.46 (t, 4H), δ 3.40 (m, 4H), δ 7.07 (d, 2H), δ 7.52 (m, 4H), δ 9.75 (NH).

Example 7

This example details the synthesis of 1,8-bis(–2-N,N-diethylamino-ethylamino) anthraquinone. A mixture containing 10.00 g (0.036 moles) 1,8-dichloroanthraquinone, 0.3 g copper powder, and 60 g (0.51 moles) of N,N-diethylethylenediamine was heated to 130° C. at atmospheric pressure for period of 5 hours. The resulting solution was then cooled to 60° C., following which it was triturated with 25 ml of methanol and stirred for an additional hour at that temperature. The product mass thus obtained was then poured slowly into 100 ml of ice cold water. The product that precipitated was then filtered, washed with water, and dried overnight at 50° C. The total yield was 8.00 g. A 97% purity was obtained as determined using HPLC. The product was characterized by $^1$H NMR spectroscopy (300 MHz, $CDCl_3$) δ 1.11 (t, 12H), δ 2.65 (q, 8H), δ 2.82 (t, 4H), δ 3.40 (m, 4H), δ 7.03 (d, 2H), δ 7.51 (m, 4H), δ 9.72 (NH).

TABLE 1

| Example | Type | R | λmax nm | $E_{600}$ | $\epsilon_{650}$ | $\epsilon_{365}$ | $\epsilon_{600}/\epsilon_{365}$ | Melting point °C |
|---|---|---|---|---|---|---|---|---|
| 1 | IX | isopropyl (CH(CH₃)₂) | 524 | 878.9 | 0 | 331.83 | 2.65 | 167–169 |
| 2 | IX | -CH₂CH₂CH₂-N(CH₂CH₃)₂ | 522 | 751.6 | 20.96 | 400 | 1.88 | 162–164 |
| 3 | X | cyclohexyl | 557 | 7975.8 | 405.8 | 487.9 | 16.34 | 234–236 |
| 4 | X | isopropyl (CH(CH₃)₂) | 553 | 6959.67 | 335.48 | 658.1 | 10.57 | 179–181 |
| 5 | X | 2-ethylhexyl | 556 | 8409.25 | 507.4 | 740.74 | 11.35 | — |
| 6 | X | -CH₂CH₂CH₂CH₂-N(CH₃)₂ | 553 | 6900.94 | 121.06 | 308.17 | 22.39 | 72–74 |
| 7 | X | -CH₂CH₂CH₂-N(CH₂CH₃)₂ | 553 | 4442.57 | 68.91 | 341.5 | 13 | 80–82 |
| N/A | IX | cyclohexyl | 528 | 1483.1 | 53.14 | 288.2 | 5.15 | — |

With respect to the HPLC data obtained for Examples 1–7, three methods were employed. All of these methods employed a flow rate of 1 milliliter per minute (ml/min), a column temperature of 25° C. Method I employed a Zorbax Eclipse XDB-C18 (a HPLC column manufactured by Agilent Technologies, Palo Alto, Calif.), 4.6×150 millimeters (mm), 5 micrometers (μm), and the solvent gradient set forth in Table 2. Method II employed a Zorbax Eclipse XDB-C18, 4.6×150 mm, 5 micrometers, and the solvent gradient set forth in Table 3. Method III employed a Zorbax Eclipse RX-SIL, 4.6×250 mm, 5 micrometers, and the solvent composition of 15 vol % acetonitrile 85 vol % dichloromethane.

TABLE 2

| Time | % A | % C | % D |
|---|---|---|---|
| 0.01 | 98 | 1 | 1 |
| 4.0 | 98 | 1 | 1 |
| 12.0 | 50 | 25 | 25 |
| 20.0 | 50 | 25 | 25 |
| 21.0 | 98 | 1 | 1 |
| 30.0 | 98 | 1 | 1 |

A = Water
C = Acetonitrile containing 0.5% triethylamine and adjusted to pH = 7.0 with glacial acetic acid
D = THF

TABLE 3

| Time | % A | % C | % D |
|---|---|---|---|
| 0.01 | 70 | 25 | 5 |
| 12.0 | 0 | 50 | 50 |
| 20.0 | 0 | 50 | 50 |
| 21.0 | 70 | 25 | 5 |
| 30.0 | 70 | 25 | 5 |

A = Water
C = Acetonitrile containing 0.5% triethylamine and adjusted to pH = 7.0 with glacial acetic acid
D = THF

Example 8

In this example, several anthraquinone derivatives were prepared and their UV-VIS spectral characteristics were measured in a methylene chloride solution in the wavelength region of 300 nm to 800 mm using a double beam UV/VIS Perkin-Elmer Lambda 900 UV/VIS/NIR spectrophotometer. The structures of the anthraquinone derivatives are shown in Table 4, while the optical properties are shown in Table 5 below.

TABLE 4

| Series | Chemical Structure | [1]Ex.# | Structural details | | |
|---|---|---|---|---|---|
| | | | $R_1$ | $R_2$ | $R_3$ |
| 1,5-dialkylamino anthraquinone | (structure shown) | N/A | cyclohexyl | H | H |
| | | 1 | [2]i-Pr | H | H |
| | | 2 | N,N-diethylaminoethyl | H | H |
| 1,8-dialkylamino anthraquinone | (structure shown) | 3 | cyclohexyl | H | H |
| | | 4 | i-Pr | H | H |
| | | 5 | 2-ethyl hexyl | H | H |
| | | 6 | 3-N,N-dimethylamino propylamine | H | H |
| | | 7 | N,N-diethylaminoethyl | H | H |

[1]Ex.# = example number
[2]iso-prop

TABLE 5

| | | | Results (in $CH_2Cl_2$) | | | | | | |
|---|---|---|---|---|---|---|---|---|---|
| Example # | [1]MP °C. | Sample Concentration (millimolar) | $\lambda_{maximum}$ | $\epsilon_{600}$ | $\epsilon_{650}$ | $\epsilon_{650}/\epsilon_{600}(\%)$ | $\epsilon_{500}$ | $\epsilon_{365}$ | $\epsilon_{600}/\epsilon_{365}$ |
| — | — | 0.062 | 528.32 | 1483.09 | 53.14 | 3.58 | 11410.6 | 288.24 | 5.15 |
| 1 | 167–169 | 0.062 | 523.78 | 878.9 | 0 | 0.00 | 14273.54 | 331.83 | 2.65 |
| 2 | 162–164 | 0.062 | 522 | 751.6 | 20.96 | 2.79 | 12090.3 | 400 | 1.88 |
| 3 | 234–236 | 0.062 | 556.74 | 7975.8 | 405.8 | 5.09 | 5734.3 | 487.9 | 16.34 |
| 4 | 179–181 | 0.062 | 552.64 | 6959.67 | 335.4 | 4.82 | 6443.5 | 658.1 | 10.57 |
| 5 | — | 0.054 | 555.76 | 8409.25 | 507.4 | 6.03 | 6655.5 | 740.74 | 11.36 |
| 6 | 72–74 | 0.0636 | 553 | 6900.94 | 121.0 | 1.75 | 6536.16 | 308.17 | 22.39 |
| 7 | 80–82 | 0.0653 | 553 | 4442.57 | 68.91 | 1.55 | 4516.08 | 341.5 | 13 |

[1]MP = melting point

As may be seen from Table 5, all the anthraquinones exhibit an absorbance ratio greater than or equal to about 1.5 at wavelengths of 600 nm to 365 nm. However, only some of the 1,5-anthraquinones exhibit an absorbance ratio of greater than or equal to about 3 at wavelengths of 600 to 365 nm. Since the 1,8-anthraquinones generally exhibit an absorbance ratio of greater than or equal to about 3 at wavelengths of 600 to 365 nm, these may be preferred over 1,5-anthraquinones in certain specialized applications requiring higher values of absorbance ratios such as optical/storage media (not limited play) and sensor applications (e.g., sensor windows) where a UV curable adhesive is located on top of a layer that will be traversed by a laser beam or any other source of light like a light emitting diode. 600 and 365 nm are examples of wavelengths. Different curing and readback systems may require different wavelengths. In this respect, Samples No. 7 and 4, which exhibit high absorbance ratios of 22.4 and 16.3 respectively at wavelengths of 600 nm to 365 nm are more preferred. It must be noted that the maximum absorption of some 1,8-anthraquinones might shift depending on the matrix they are placed in (solvatochromism effect). As a result, although a larger absorbance ratio could be observed for a certain compound in methylene chloride solution, the final ratio in a polycarbonate composition might be lower. In addition, suitability for the resin system and the application requirements must be determined as known in the art. This evaluation typically involves testing of colored resin composition for stability of rheological properties. In general, a colorant leading to a large shift in viscosity (typically greater than or equal to about 20% viscosity change after 30 minutes dwell at 300° C.) could be suspected of interacting with the resin composition and therefore might not be suitable as a colorant for this particular resin and loading combination.

The absorbance ratio for all of the anthraquinone derivatives at wavelengths of 650 nm to 600 nm is expressed as a percentage and is generally less than 10%. The 1,5-anthraquinone derivatives also show lower extinction coefficients than the 1,8-anthraquinone derivatives at 650 nm. By mixing the 1,5-anthraquinone derivatives with the 1,8-anthraquinone derivatives, it may be possible to fine tune the absorbance ratios to a desirable value. This ability to fine tune the absorbance ratios may be useful when it is desirable to increase the transmission of the media (e.g., the disk substrate) at wavelengths of about 650 nm, while increasing the absorption at wavelengths of about 550 nm.

Example 9

Polycarbonate comprising 1,8-bis(cyclohexylamino)anthraquinone

Polycarbonate thermoplastic compositions corresponding to Formulations A to D were prepared and extruded on a 30 mm extruder ZSK-30 model commercially available from Werner and Pfleiderer, New Jersey. The extrusion conditions were: Zone 1=480° F.; Zone 2=500° F.; Zone 3=520° F.; Zone 4=540° F.; Zone 5=550° F.; Die head=550° F.; and Screw speed=400 to 450 revolutions per minute (rpm). The detailed composition of these formulations is shown in Table 6.

TABLE 6

| Composition | Sample (parts by weight) | | | |
| --- | --- | --- | --- | --- |
|  | A | B | C | D |
| OQ[1] Polycarbonate resin (Mw = 17,700 amu) | 100 | 100 | 100 | 100 |
| Mold release agent | 0.03 | 0.03 | 0.03 | 0.03 |

TABLE 6-continued

| Composition | Sample (parts by weight) | | | |
| --- | --- | --- | --- | --- |
|  | A | B | C | D |
| Phosphite stabilizer | 0.02 | 0.02 | 0.02 | 0.02 |
| 1,8-AQ | 0.01 | | | |
| Solvent Red 207[2] | | 0.01 | | |
| Solvent Red 52 | | | 0.01 | |
| Disperse Violet 26 | | | | 0.01 |

[1]OQ = optical quality
[2]Solvent Red 207 = 1,5-bis(cyclohexylamino)anthraquinone The 1,8-bis(cyclohexylamino)anthraquinone compound used in the formulations was synthesized according to the experimental procedure previously described. Its purity was confirmed to be greater than 99% per HPLC (99.13% in this case).

Figure 3:
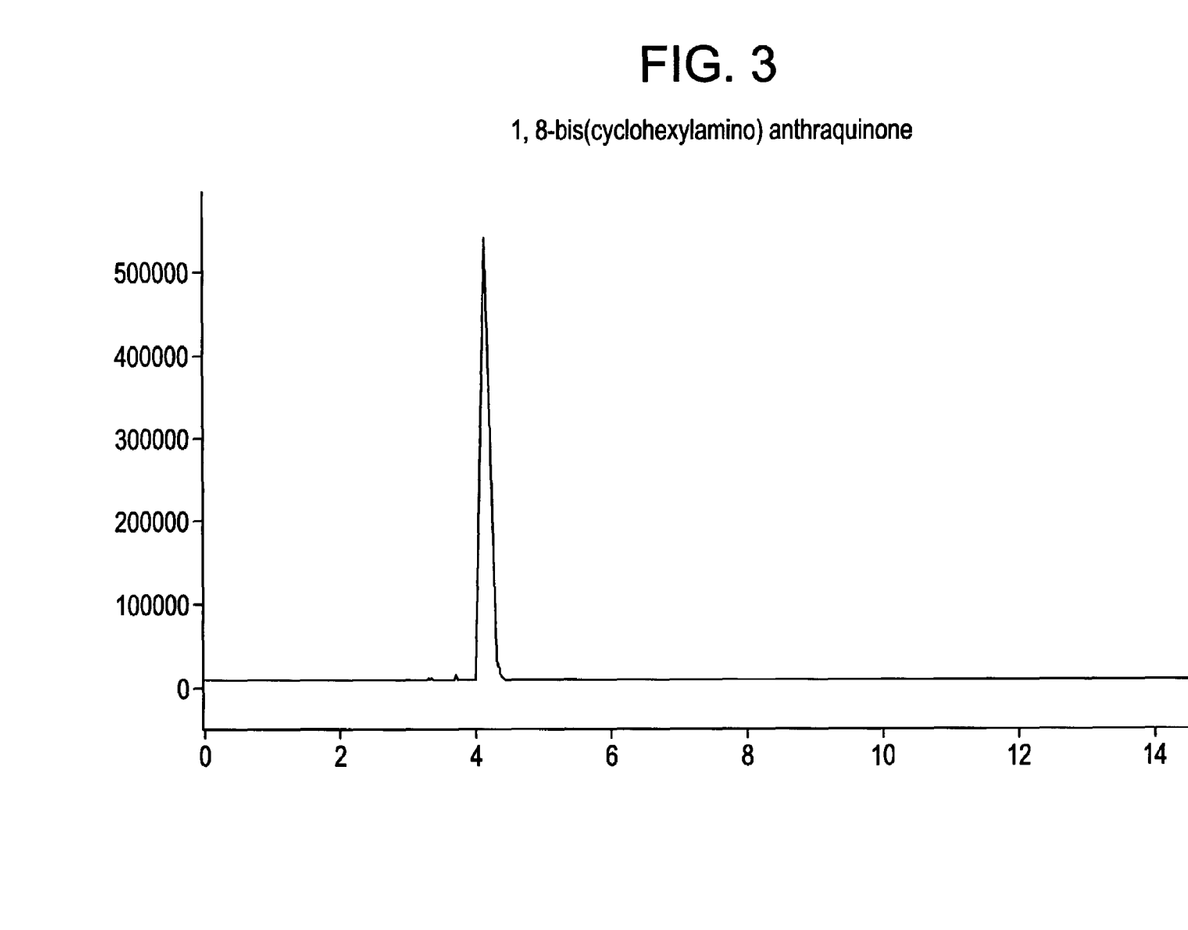
FIG. 3 is a graphical representation of the HPLC chromatogram obtained for a 1,8-bis(cyclohexylamino)anthraquinone obtained in a suitable purity to be used as a colorant.

The following parameters were used for the HPLC analysis:
  Column: micro-Porasil 3.9×300 mm #27477, Waters
  Solvent: 75/20/5 (v/v) hexane, chloroform, ethyl acetate
  Flow Rate: 1.0 ml/min (milliliters per minute)
  Injection: 10 μl (microliters)
  Detector: UV in max plot mode at 280 nm, 320 nm
  Sample Preparation: not more than 0.0 g weighed into a 25 ml volumetric, dilute to volume with chloroform The dye elutes as a single peak at retention time of 4.15 minutes as seen in FIG. 3, which is a HPLC trace of the 1,8-bis(cyclohexylamino)anthraquinone dye used in Example 9, an integration of the chromatogram indicates a dye purity of 99.13%. For reference, the starting material, 1,8-dichloroanthraquinone has a retention time of 5.57 minutes. A dye in which the reaction is incomplete would feature a double peak with retention times at 4.15 minutes (1,8-dicyclohexylaminoanthraquinone) and 4.28 minutes (monocyclohexylamino anthraquinone) as well as the starting material (1,8-dichloroanthraquinone at 4.15 minutes).

The phosphite stabilizer was Doverphos S-9228 from Dover Chemicals, and the mold release agent was Glycerol Monostearate from Mitsubishi International Corporation. Both Disperse Violet 26 and Solvent Red 52 were obtained from Bayer Corporation (Colorants Division, Pittsburgh, USA) under the respective trade names of Macrolex Violet H and Macrolet Violet 5B. Solvent Red 207 was obtained from Keystone Aniline Corporation (Chicago, Ill., USA) under the trade name Keyplast Magenta M6B.

After extrusion, the pelletized material corresponding to Formulations A to D were injection molded using a barrel temperature of 600° F. (315° C.) with a standard cycle time of about 45 seconds to form colored transparent step plaques with the following dimensions: 5.08 cm (width)×7.62 cm (height)×3.2 mm (thickness). After collecting 6 plaques without visible defects, the cycle time was increased in order to evaluate the sensitivity of the different colorants to increased residence time in the barrel of the molding machine. The cycle time was set in order to collect plaques corresponding to a material residence time of about 5 minutes in the barrel (cycle time settings depend on the shot size and barrel size of the molding machine). The procedure was then repeated with a barrel temperature of 620° F. (327° C.).

After molding, the plaques were allowed to cool down overnight before being measured using a color spectrophotometer Color Eye 7000A from Gretag MacBeth, New Windsor, N.Y. The instrument, equipped in standard with integrating sphere geometry, was used to measure color of each specimen as described in standard practice ASTM E1164. Transmission measurements were carried out according to method ASTM E1348. Before measurement, the instrument was calibrated using the standard white calibration tile provided with the instrument. The UV filter position was also calibrated according to the MacBeth CE7000A manual in order to simulate a D65 light source (UVD65 setting). All measurements (reflectance and transmission mode) were taken with the specular component of light included (SCI), UV included and calibrated (UVD65), a large viewing aperture (LAV) and a large viewing area (LAV).

Color coordinates were calculated by the Gretag MacBeth ProPalette Optiview 5.2 software for several color spaces from the spectral curve taken between 360 nm and 750 nm for a 10 degree observer using the CIE L*a*b* (i.e. L*a*b* coordinates) and CIE 1976 LCh systems. Color differences (ΔE*) were calculated versus the plaque of same composition molded at 600° F. (or 315° C.) with a standard cycle time using the CIE L*a*b* color coordinates measured for each sample. Results are summarized in Table 7.

TABLE 7

| Composition | Barrel temperature (° F./° C.) | Residence time | L* | a* | b* | DE* |
|---|---|---|---|---|---|---|
| A | 600/315 | Standard | 53.49 | 45.82 | −43.25 | 0.00 |
| A | 600/315 | 5 min | 53.69 | 45.55 | −42.21 | 1.09 |
| A | 620/327 | Standard | 53.58 | 46.07 | −41.96 | 1.32 |
| A | 620/327 | 5 min | 55.46 | 43.07 | −36.85 | 7.24 |
| B | 600/315 | Standard | 59.79 | 68.54 | −22.79 | 0.00 |
| B | 600/315 | 5 min | 60.75 | 65.26 | −19.52 | 4.73 |
| B | 620/327 | Standard | 59.97 | 67.81 | −22.04 | 1.06 |
| B | 620/327 | 5 min | 61.19 | 63.49 | −17.61 | 7.36 |
| C | 600/315 | Standard | 57.55 | 70.23 | −36.13 | 0.00 |
| C | 600/315 | 5 min | 57.58 | 69.96 | −35.48 | 0.70 |
| C | 620/327 | Standard | 57.71 | 69.93 | −35.91 | 0.41 |
| C | 620/327 | 5 min | 57.73 | 69.63 | −35.20 | 1.12 |
| D | 600/315 | Standard | 59.44 | 53.63 | −38.85 | 0.00 |
| D | 600/315 | 5 min | 63.11 | 44.58 | −28.77 | 14.03 |
| D | 620/327 | Standard | 61.16 | 49.37 | −34.41 | 6.39 |
| D | 620/327 | 5 min | 64.15 | 41.82 | −25.73 | 18.27 |

When a compound is used as a colorant in a thermoplastic composition, it is desirable for the compound to exhibit enough heat stability in this composition to allow molding of parts using various cycle times. The cycle time and the molding temperature depend on the application (part design/mold design), the characteristics of the molding machine used and, of course, the rheology of the polymer matrix. To allow the largest processing window possible, it is desirable to have colorants that can support extended cycle times or increased molding (i.e., barrel) temperature without leading to a significant color shift (i.e., color difference). A colorant is usually said to be stable if the color difference observed is less than or equal to about 3.

The results presented in Table 7 clearly indicate that composition D, in which Disperse Violet 26 is used as a colorant, shifts very significantly when the cycle time is increased from 600° F. (315° C.) to 620° F. (327° C.). In addition, composition D also undergoes a significant color shift at 600° F. (315° C.) when the cycle time is increased from standard to 5 minutes. This is an indication that Disperse Violet 26 is not heat stable enough to be used in polycarbonate at temperatures of 600° F. (315° C.) or above. In comparison, composition C (which is based on Solvent Red 52) appears to be stable at both 600° F. and 620° F. for standard or extended cycle times as illustrated by a maximum color shift of 1.12 at 620° F. for a residence time of about 5 minutes. Solvent Red 207 (i.e., 1,5-bis(cyclohexylamino)anthraquinone), which is used in composition B, seems to be stable enough to be in polycarbonate compositions molded at 620° F. with a standard cycle time. However, it must be noted that Solvent Red 207 does not have enough heat stability to sustain an extended molding cycle as illustrated by the color shift of 4.73 measured when the material residence time is increased to 5 minutes. As a result, such compositions should be restricted to applications where a short cycle time is required with molding temperatures of 600° F. (315° C.) or below. Such limitation prevents a broad use of Solvent Red 207 as a colorant in polycarbonate formulations. Interestingly, Composition A (which contains 1,8-bis(cyclohexylamino)anthraquinone having a purity of 99%) exhibits an improved heat stability when compared to Solvent Red 207. In fact, composition A is stable at 600° F. (even for extended cycle times) and also at 620° F. for standard cycle times. A significant color shift only appears at 620° F. for a material residence time of about 5 minutes. This illustrates that, when 1,8-bis(cyclohexylamino)anthraquinone is used as a colorant in polycarbonate compositions, it provides for a larger processing (i.e., molding) window when compared to 1,5-bis(cyclohexylamino)anthraquinone.

CIE 1976 LCh ("Lightness"/"Chroma"/"Hue") color coordinates for the different compositions molded at 600° F. (315° C.) with a standard cycle time are shown in Table 3. Visually, the plaques molded from composition B appear of a red/magenta color. In comparison, plaques molded from composition A appear much more violet (i.e., blue shaded red). In fact, plaques molded from composition A appear of a bluer shade than D, which appears bluer than C, which appears bluer than B. This trend is illustrated by the differences in hue angle as shown in Table 3. Composition A has the smallest hue angle (316.65°), which is consistent with the visual observation. All other compositions have a hue angle greater than about 320°, and especially greater than 324°.

TABLE 8

| Composition | Molding temp.[1] | L* | C* | h° |
|---|---|---|---|---|
| A | 600° F. | 53.49 | 63.01 | 316.65 |
| B | 600° F. | 59.79 | 72.23 | 341.61 |
| C | 600° F. | 57.55 | 78.98 | 332.78 |
| D | 600° F. | 59.44 | 66.22 | 324.08 |

[1] a standard cycle time was used (e.g. 45 seconds)

Soluble (i.e., that have the ability to disperse/solubilize in the thermoplastic resin without forming visible scattering domains) red colorants with a blue shade are not very common. In fact, in this area of the color space, very few colorants (and dyes especially) have enough heat stability to be used in polycarbonate. Solvent Red 52 and Disperse Violet 26 are examples of blue shaded red dyes that can be found on the market for application in thermoplastic resins. From the results of Table 8, it appears that 1,8-bis(cyclohexylamino)anthraquinone has bluer shade than both of these colorants. In addition, it has enough heat stability to be used in polycarbonate compositions molded at 600° F. even with long cycle times, or at 620° F. with a short cycle time. As seen previously, Disperse Violet 26 does not have the heat stability required for use in polycarbonate compositions requiring molding at 600° F. (315° C.). As seen in other examples of this application, Solvent Red 52 (which is an anthrapyridone derivative) exhibits a very strong absorption at about 365 nm due to its chemical structure. Consequently, although it has excellent heat stability, it is not desirable to use it as a colorant in thermoplastic compositions that will be formed into parts through which UV curing needs to occur (e.g., a DVD substrate). Conversely, 1,8-bis(cyclohexylamino) anthraquinone has a very low light absorption at about 365 nm which, combined to its relatively good heat stability and extreme blue shade for a red colorant, makes it an excellent candidate for use in thermoplastic compositions that require light transmission in the UV range at about 365 nm for photo-curing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A colored polymeric resin composition, comprising:
a polymeric resin, wherein the polymeric resin is polyvinyl chloride, polyolefin, polyamide, polysulfone, polyimide, polyether imide, polyether sulfone, polyphenylene sulfide, polyether ketone, polyether ether ketone, ABS resin, polystyrene, polybutadiene, polyacrylate, polyacrylonitrile, polyacetal, polycarbonate, polyphenylene ether, ethylene-vinyl acetate copolymer, polyvinyl acetate, liquid crystal polymer, ethylene-tetrafluoroethylene copolymer, polyvinyl fluoride, polyvinylidene fluoride, polyvinylidene chloride, polytetrafluoroethylene, or combinations comprising at least one of the foregoing polymeric resins; and
a 1,8-diaminoanthraquinone derivative having a purity of greater than or equal to about 90 wt % and having a Formula (VIII):

(VIII)

wherein $R_2$–$R_7$ are, individually, selected from the group consisting of a hydrogen atom, an aliphatic group, an aromatic group, a heterocyclic group, a halogen atom, a cyano group, a citro group, —$COR_9$, —$COOR_9$, $NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of cyclohexyl, isopropyl, 3-N,N-dimethylaminopropyl, N,N-diethylaminoethyl, an allyl group containing 3 to 20 carbon atoms, a hydroxyl group, a 5-membered heterocyclic ring, and a 6-membered heterocyclic ring.

2. The composition of claim 1, wherein the 1,8-diaminoanthraquinone derivative has a heat stability of about 600° F. (315° C.), a maximum absorption located between about 530 and 610 nm, an extinction coefficient at 650 nm of less than or equal to about 1,000 $mol^{-1} \cdot cm^{-1} \cdot L$ (measured in $CH_2Cl_2$ solution), a minimum extinction coefficient at 600 nm greater than or equal to about 1,500 $mol^{-1} \cdot cm^{-1} \cdot L$, or combinations thereof.

3. The composition of claim 1, wherein the 1,8-diaminoanthraquinone derivative has a light transmission of greater than or equal to about 70% at 650 nm, a curing index of greater than or equal to about 0.1 and a filtration index of greater than or equal to about 2.5, and a ratio of extinction coefficient at 650 nm to 600 nm less than about 0.1.

4. The composition of claim 1, wherein the 1,8-diaminoanthraquinone derivative has an absorbance ratio at 600 nm to 365 nm of greater than or equal to about 2.

5. The composition of claim 4, wherein the absorbance ratio at 600 nm to 365 nm is greater than or equal to about 5.

6. The composition of claim 5, wherein the absorbance ratio at 600 nm to 365 nm is greater than or equal to about 10.

7. The composition of claim 1, wherein the polymeric resin comprises polycarbonate.

8. The composition of claim 1, wherein the 1,8-diaminoanthraquinone derivative is present in an amount of about 0.01 wt % to about 5 wt %, based upon the total weight of the composition.

9. The composition of claim 1, wherein the 1,8-diaminoanthraquinone derivative is present in an amount of about 0.01 wt % to about 1 wt %, based upon the total weight of the composition.

10. The composition of claim 1, wherein the 1,8-diaminoanthraquinone derivative has a filtration index greater than or equal to about 4.0.

11. The composition of claim 10, wherein the filtration index is greater than or equal to about 6.

12. The composition of claim 1, wherein the 1,8-diaminoanthraquinone derivative has a curing index greater than or equal to about 0.5.

13. The composition of claim 12, wherein the curing index is greater than or equal to about 5.

14. The composition of claim 1, wherein the 1,8-diaminoanthraquinone derivative comprises 1,8 bis(cyclohexylamino)anthraquinone.

15. The composition of claim 1, wherein the 1,8-diaminoanthraquinone derivative comprises 1,8-bis(oyclohexylamino)anthraquinone, 1,8-bis(isopropylamino)anthraquinone, 1,8-bis(N,N-diethylaminoethylamino)anthraquinone, or 1,8-bis(3-N,N-dimethylaminopropylamino)anthraquinone.

16. The composition of claim 15, wherein the 1,8-diaminoanthraquinone derivative is present in an amount of about 0.1 wt % to about 0.4 wt %, based upon the total weight of the composition.

17. The composition of claim 1, wherein the 1,8-diaminoanthraquinone derivative has a ratio of extinction coefficient at 650 nm to the maximum extinction coefficient of less than or equal to about 0.1.

18. The composition of claim 1 wherein the 1,8-diaminoanthraquinone derivative has a ratio of extinction coefficient at 650 nm to the extinction coefficient at 600 nm of less than or equal to about 0.1.

19. The composition of claim 1, wherein the 1,8-diaminoanthraquinone derivative has a maximum absorption located between about 540 nm and about 600 nm as measured in metbylene chloride solution.

20. The composition of claim 19, wherein the maximum absorption is located between about 550 nm and about 590 nm as measured in methylene chloride solution.

21. The composition of claim 1, wherein the 1,8-diaminoanthraquinone derivative gives a hue angle value of less than 335 degrees in polycarbonate composition when used at a loading of 0.01 pph at a part thickness of 3.2 mm.

22. The composition of claim 21, wherein the hue angle is less than or equal to about 330 degrees.

23. The composition of claim 22, wherein the hue angle of less than or equal to about 320 degrees.

24. A colored polymeric resin composition, comprising:
a polymeric resin, wherein the polymeric resin is polyvinyl chloride, polyolefin, polyamide, polysulfone, polyimide, polyether imide, polyether sulfone, polyphenylene sulfide, polyether ketone, polyether ether ketone, ABS resin, polystyrene, polybutadiene, polyacrylate, polyacrylonitrile, polyacetal, polycarbonate, polyphenylene ether, ethylene-vinyl acetate copolymer, polyvinyl acetate, liquid crystal polymer, ethylene-tetrafluoroethylene copolymer, polyvinyl fluoride, polyvinylidene fluoride, polyvinylidene chloride, polytetrafluoroethylene, or combinations comprising at least one of the foregoing polymeric resins; and
a 1,8-diaminoanthraquinone derivative having a purity of greater than or equal to 90 wt % and having a Formula (VIII):

(VIII)

wherein $R_2$–$R_7$ are, individually, selected from the group consisting of a hydrogen atom, an aliphatic group, an aromatic group, a heterocyclic group, a halogen atom, a cyano group, a nitro group, —$COR_9$, —$COOR_9$, —$NR_{10}C0R_{11}$, —$NR_{10}SO_2R_{11}$, —$CONR_9R_{10}$, —$C0NHS0_2R_{11}$, and —$SO_2NHCOR_{11}$; in which $R_9$ and $R_{10}$ are, individually, selected from the group consisting of a hydrogen atom, an aliphatic group, an aromatic group, and a hetemocyclic group; wherein $R_{11}$ is selected from the group consisting of an aliphatic group, an aromatic group, and a heterocyclic group; and wherein R is selected from the group consisting of cyclohexyl, isopropyl, 3-N,N-dimethylaminopropyl, N,N-diethylaminoethyl, an allyl group containing 3 to 20 carbon atoms, a hydroxyl group, a 5-membered heterocyclic ring, and a 6-membered heterocyclic ring;
wherein an article farmed from the composition has a hue angle value of less than or equal to about 330 degrees when used at a loading of 0.01 pph at an article thickness of 3.2 mm.

25. The composition of claim 24, wherein the hue angle is less than or equal to about 320 degrees.

26. The composition of claim 21, wherein said polymeric resin is a polycarbonate resin.

27. The composition of claim 26 wherein the polycarbonate resin has a weight average molecular weight (Mw) of less than or equal to about 20,000.

28. An article formed from the composition of claim 1.

29. An article formed from the composition of claim 21.

30. An article formed from the compositica of claim 24.

31. An article fonned from the composition of claim 27.

32. A method of making a colored polymeric article, comprising:
forming a composition of a polymeric resin and a 1,8-diaminoanthraquinone derivative, wherein the polymeric resin is polyvinyl chloride, polyolefin, polyamide, polysulfone, polyimide, polyether imide, polyether sulfone, polyphenylene sulfide, polyether ketone, polyother ether keton, ABS resin, polystyrene, polybutadiene, polyacrylate, polyacrylonitrile, polyacetal, polycarbonate, polyphenylene ether, ethylene-vinyl acetate copolymer, polyvinyl acetate, liquid crystal polymer, ethylene-tetrafluoroethylene copolymer, polyvinyl fluoride, polyvinylidene fluoride, polyvinylidene chloride, polytetrafluoroethylene, or combinations comprising at least one of the foregoing polymeric resins, and wherein the 1,8-diaminoanthraquinone derivative has a purity of greater than or equal to about 90 wt %, and has a Formula (VIII):

(VIII)

wherein $R_2$–$R_7$ are, individually, selected from the group consisting of a hydrogen atom, an aliphatic group, an aromatic group, a heterocyclic group, a halogen atom, a cyano group, a nitro group, —$COR_9$, —$COOR_9$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of cyclohexyl, isopropyl, 3-N,N-dimethylaminopropyl, N,N-diethylaminoethyl, an allyl group containing 3 to 20 carbon atoms, a hydroxyl group, a 5-membered heterocyclic ring, and a 6-membered heterocyclic ring;
wherein the 1,8-anthraquinone derivative gives a hue angle value of less tan or equal to about 330 degrees when used at a loading of 0.01 pph at an article thickness of 3.2 mm; and
forming the composition into the article.

33. The method of claim 32, wherein the 1,8-diaminoanthraquinone derivative is present in an amount of less than or equal to about 80 wt % based upon the total weight of the composition.

34. The method of claim 32, further comprising forming the composition insitu during the forming of the article.

35. The method of claim 34, wherein the forming of the composition insitu further comprises using at least one of a masterbatch, single colorant dispersion, or a liquid dying process.

36. The method of claim 32, wherein the polymeric resin is formed into colored pellets prior to being introduced to a mold.

37. A colorant, comprising:
a 1,8-diaminoanthraquinone derivative having a purity of greater than or equal to about 90 wt % and having a Formula (VIII):

(VIII)

wherein $R_2$–$R_7$ are, individually, selected from the group consisting of a hydrogen atom, an aliphatic group, an aromatic group, a heterocyolic group, a halogen atom, a cyano group, a nitro group, —$COR_9$, —$COOR_9$, $NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of an allyl group containing 3 to 20 carbon atoms, a 5-membered heterocyclic ring, and a 6-membered heterocyclic ring.

* * * * *